United States Patent [19]

Pitts, Jr.

[11] 4,231,070

[45] Oct. 28, 1980

[54] HIGH SPEED COPYING MEANS AND METHOD

[75] Inventor: Robert W. Pitts, Jr., Houston, Tex.

[73] Assignee: Texaco Inc., White Plains, N.Y.

[21] Appl. No.: 967,327

[22] Filed: Dec. 7, 1978

[51] Int. Cl.² .................. H04N 1/04; H04N 1/36; H04N 1/02

[52] U.S. Cl. .................. 358/285; 358/264; 358/294

[58] Field of Search ............... 358/285, 264, 265, 266, 358/272, 256, 294

[56] References Cited

U.S. PATENT DOCUMENTS

| | | | |
|---|---|---|---|
| 3,443,028 | 5/1969 | Pavlik | 358/256 |
| 3,848,087 | 11/1974 | Carrell | 358/264 |
| 3,943,529 | 3/1976 | Feldman et al. | 358/256 |
| 3,997,722 | 12/1976 | Bardos | 358/285 |

*Primary Examiner*—Robert L. Griffin
*Assistant Examiner*—Edward L. Coles
*Attorney, Agent, or Firm*—Carl G. Ries; Robert A. Kulason; Ronald G. Gillespie

[57] ABSTRACT

A copier provides output signals corresponding to subject matter on material being copied. The copier includes a light source which provides light pulses that impinge upon the material. The material provides light pulses to a light sensitive sensor in accordance with the subject matter on the material. The sensor provides electrical pulses on a one-for-one basis with the received light pulses from the material. An output circuit provides the output signals in accordance with the electrical pulses from the sensor.

7 Claims, 5 Drawing Figures

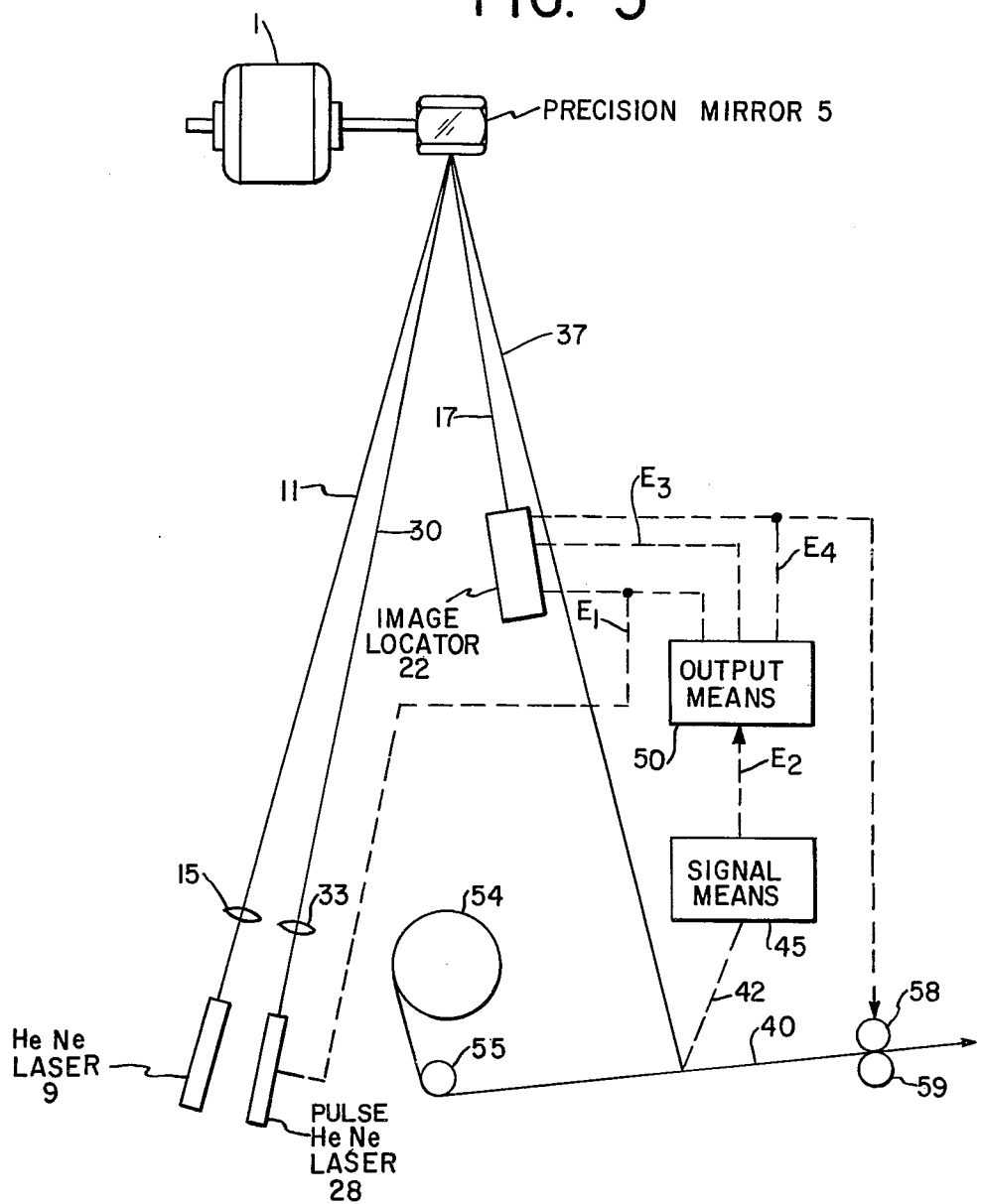

HIGH SPEED COPYING MEANS AND METHOD

BACKGROUND OF THE INVENTION

Field of the Invention

The present invention relates to copying means and method in general and, more particularly, to high speed copying means and methods.

SUMMARY OF THE INVENTION

A high speed copier provides output signals corresponding to a subject matter being copied. The copier includes a light source which provides light pulses in a scanning manner over the subject matter so that the subject matter provides some of the light pulses to a light sensor. The light sensor provides electrical pulses on a one-for-one basis with received light pulses. An output circuit provides the output signals in accordance with the electrical pulses from the light sensor.

The objects and advantages of the invention will appear more fully hereinafter from a consideration of a detailed description which follows, taken together with the accompanying drawings wherein two embodiments of the invention are illustrated by way of example. It is to be expressly understood, however, that the drawings are for illustration purposes only and are not to be construed as defining the limits of the invention.

DESCRIPTION OF THE DRAWINGS

FIG. 5 shows another embodiment of the present invention.

DESCRIPTION OF THE INVENTION

Figure 1:
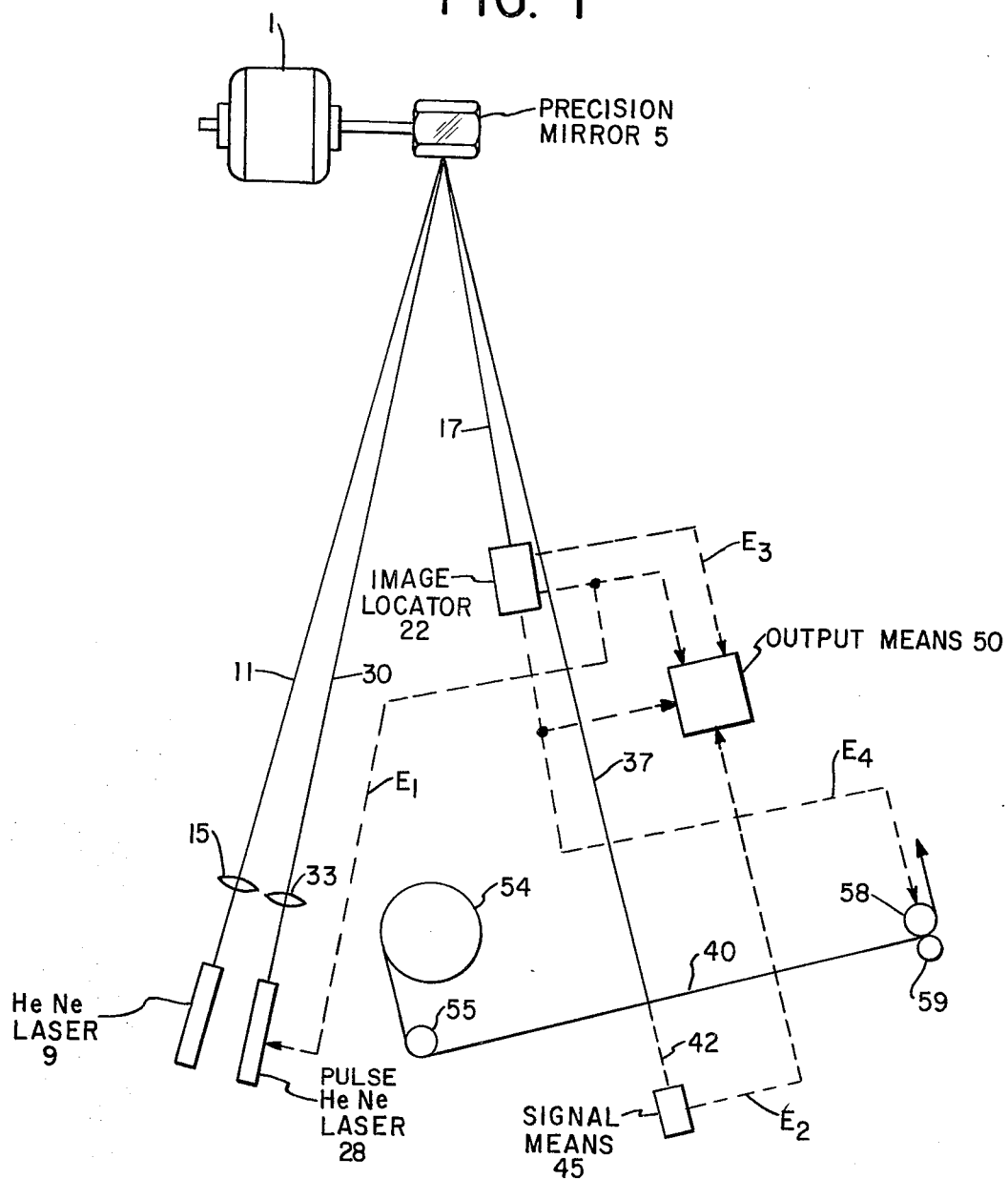
FIG. 1 shows a copier, constructed in accordance with the present invention, in partial schematic form and in partial block diagram form.

Referring to FIG. 1, a motor 1, when energized, rotates an eight sided precision mirror 5 at a predetermined rate. A conventional type $H_eN_e$ laser 9 emits a continuous light beam 11 which passes through a lens element 15 to focus on point in a plane of the mirror 5 which reflects beam 5 in a manner so that a reflection beam 17 will scan the surface of image sensor array means 20 (not shown in FIG. 1) of an image locator 22. Laser 9 may also be a $H_eC_d$ or a $H_eS_e$ laser.

Image locator 22, as hereinafter explained, controls the pulsing of another $H_eN_e$ laser 28 with a pulse signal $E_1$. When pulsed, laser 28 provides a pulse of light 30, which passes through a lens 33 to strike the surface of mirror 5 at the same point as beam 11 strikes mirror 5. Mirror 5 reflects light pulses 30 as light pulses 37.

Light pulses 37 impinge on the subject matter to be copied, hereinafter referred to as copy 40, so that they pass through translucent areas of copy 40 as light pulses 42. Light pulses 37 do not pass through opaque areas of copy 40, so that the absence of light pulses 42 can be correlated to the information on copy 40. Light pulses 42 impinge on signal means 45 which is similar to image locator 22 except there are no 'start' and 'end' sensors. Signal means 45 provides electrical pulses $E_2$ on a one-for-one basis with received light pulses 42. Pulses $E_2$ are provided to output means 50 also receiving pulses $E_1$ and a start pulse $E_3$ from image locator 22.

As shown in FIG. 1, copy 40 is stored on a drum 54 and passes over a wheel 55 before being subjected to light pulses 37. Copy 40 passes through a drive wheel 58 and another wheel 59. Drive wheel 58 is controlled by pulses $E_4$ from image locator means 22 so that after each scanning operation copy 40 is moved a predetermined amount. Of course, it would be obvious to one skilled in the art that copy 40 need not be stored on the drum and provided by way of rollers. However, with the high speed copying of the present invention, a backlog of copy should be set up to take full advantage of the high speed copying.

Figure 2:
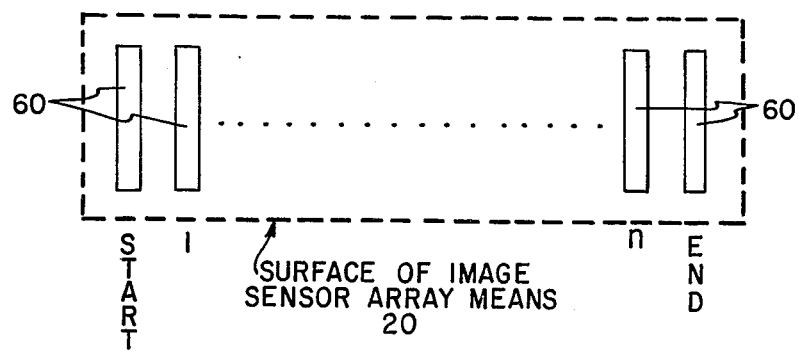
FIG. 2 is a graphical representation of the surface of an image sensor array means of the image locator shown in FIG. 1.

Referring now to FIG. 2, image sensor array means 20 includes a plurality of image sensors 60. Image array means 20 may be similar to the linear image sensors manufactured by Fairchild Semiconductor Company as their part number CCD131. For purpose of discussion, the number of sensor elements 60 will be 1024, although there is no limit to the actual number of sensor elements 60.

Figure 3:
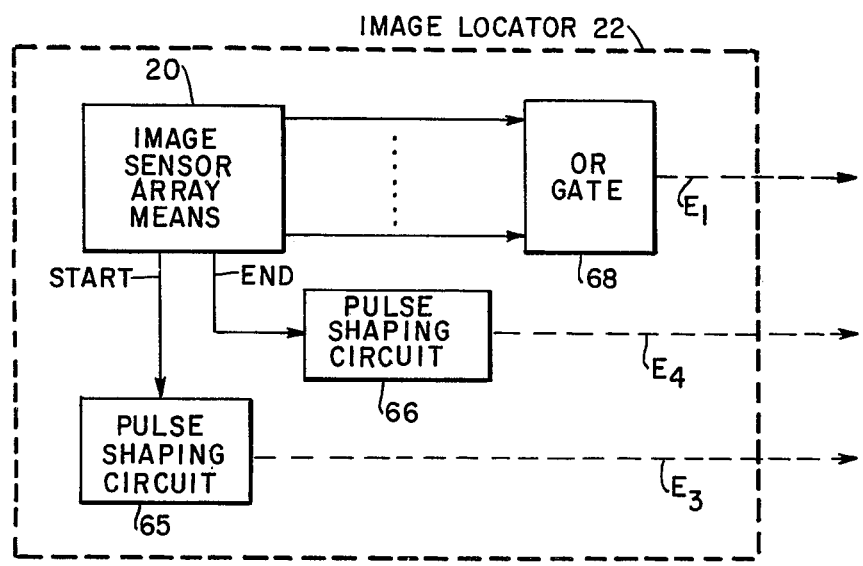
FIGS. 3 and 4 are detailed block diagrams of the image locator and the output means, respectively, shown in FIG. 1.

Referring also to FIG. 3, due to the rotation of mirror 5, beam 17 will move across sensing elements 60 in a manner so that it will strike a first image sensor 60, labelled 'start' and continue on illuminating the other image sensors 60 one at a time in sequence at a rate governed by the rotational speed of mirror 5. When beam 17 passes image sensor 60 labelled 'end', the next side of mirror 5 causes beam 17 to scan image sensor array means 20 again. Thus a complete revolution of mirror 5 causes beam 17 to scan image sensor array means 20 eight times.

When beam 17 illuminates the 'start' image sensor 60, sensor 60 provides a pulse to a pulse shaping circuit 65 which provides pulse $E_3$. The 'end' pulse is applied to a pulse shaping circuit which provides pulses $E_4$. The outputs of image sensors 60 with the exception of the 'start' and 'end' image sensors 60, are applied to an OR gate 68. It would be obvious to one skilled in the art that OR gate 68 represents a plurality of OR gates connected to operate as a single OR gate. OR gate 68 provides pulses $E_1$.

Figure 4:
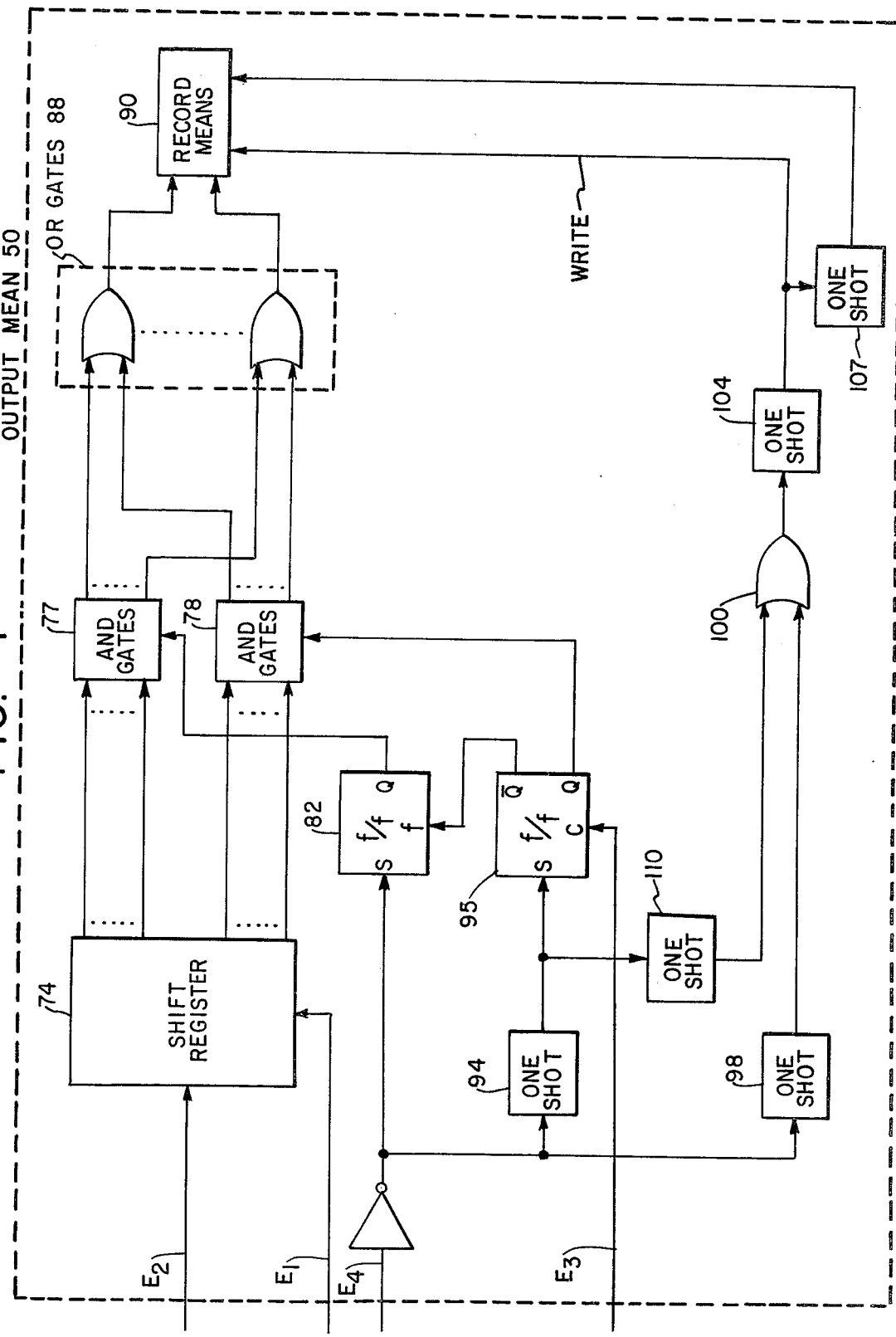

Referring now to FIG. 4, pulses $E_1$, $E_2$ are applied to a shift register 74. Shift register 74 is shifted by pulses $E_1$ and enters pulses $E_2$ as its content. Thus, at the end of a scan, the contents of shift register 74 corresponds to a representation of the scan in regard to opaque and translucent areas of copy 40. Shift register 74 provides digital signals to AND gates 77 and 78. At this point, the digital signals from shift register 74 may be used as an output corresponding to the copy 40. However, the correspondance is in a negative way. The complement of the digital signals from register 74 would yield a positive correspondence. The digital signals from register 74 are separated into two groups of digital signals so that they may be recorded on magnetic tape as hereinafter explained.

Clock pulses $E_4$ are provided to an inverter 81 where they are inverted and applied to the S input of a flip-flop 82, triggering it to a set state. When in a set state, a flip-flop provides a high logic level signal at its Q output and a low logic level signal at its $\bar{Q}$ output. In a clear state a flip-flop provides low logic level and high logic level signals at its Q and $\bar{Q}$ outputs, respectively. Flip-flop 82 Q signal is applied to AND gates 77 and to an OR gate 84. The high logic level signal causes AND gates 77 to pass the digital signals from shift register 74 to a plurality of OR gates 88. There is an OR gate in OR gate 88 for every writing head in record means 90.

Pulse $E_4$ is also provided to a one-shot multivibrator 94 which is utilized as a time delay pulse $E_4$ by providing a pulse to the S input of a flip-flop 95 whose trailing edge triggers flip-flop 95 to a set state. The Q signal from flip-flop 95 controls AND gates 78 to pass the digital signals when it is at a high logic level and to block the digital signals when it is at a low logic level. Flip-flop 95 is triggered to the clear state by the next pulse $E_3$ applied to its C input. The $\overline{Q}$ signal from flip-flop 95 is used to trigger flip-flop 82 to its clear state.

The inverted pulse from inverter 81 triggers another one-shot multivibrator 98, causing it to provide a pulse. The pulse from one-shot 98 passes through an OR gate 100 to trigger yet another one-shot multivibrator 104 which provides a 'write' pulse to record means 90. Record means 90 records the digital signals from OR gate 88 in response to the 'write' pulse. The 'write' pulse also triggers a one-shot multivibrator 107 causing it to provide a pulse to record means 90. Record means 90 advances the magnetic tape in response to the pulse from one shot 107.

The pulse from one-shot 94 also triggers another one-shot multivibrator 110 causing it to provide a pulse to OR gate 100 to cause the same results as hereinbefore described for the pulse from one-shot 98.

The operational sequence is such that during one scan, a pulse $E_3$ clears flip-flop 95 so that neither AND gates 77 or 78 are enabled as pulses $E_1$ and $E_2$ are applied to shift register 74.

At the end of the scan, a pulse $E_4$ occurs causing flip-flop 82 to enable AND gates 77 so that half of the digital signals from shift register 74 are applied to record means 90. After a predetermined time delay controlled by one-shot 98, one-shot 104 provides a 'write' pulse to record the first half of the digital signals from register 74. After the recording, one-shot 107 provides a pulse causing the tape to advance.

All of the foregoing takes place during a time delay controlled by one-shot 94. At the end of this delay, flip-flop 82 is cleared while flip-flop 95 is set so that AND gates 78 now pass the second half of the digital signals to record means 90. Also at the end of this time delay, another predetermined time delay occurs which is controlled by one-shot 110 before one-shot 104 provides a 'write' pulse to record means 90 to record the second half of the digital signals from shift register 74.

FIG. 5 shows another embodiment of the present invention, in which signal means 45, instead of being placed behind copy 40, is placed in front of it and copy 40 is orientated with mirror 5 so that light pulses 37 may be reflected from copy 40 to signal means 45. For example, where the copy 40 is in the form of black printed letters on a white background, light pulses 37 would be reflected as light pulses 42 by the white background.

What is claimed is:

1. Apparatus for providing output signals corresponding to a copy comprising a first laser emitting a beam of light, a mirror having a plurality of faces is spacially related to the first laser so that the light beam is reflected by the mirror when it is rotating in a manner so as to perform a scanning operation, means for rotating the mirror at a predetermined rate, image locator means spacially related to the copy and to the mirror for providing control pulses in accordance with the scanning of the light beam, a second laser spacially related with the first laser and the mirror and connected to the image locator means provides pulses of light which strike the surface of the mirror at the same point that the light beam strikes and is reflected therefrom to impinge upon the copy, light sensitive means spacially related to the copy for receiving pulses of light from the copy and providing electrical pulses on a one-for-one basis with received light pulses, and means connected to the light sensitive means for providing the output signals in accordance with the electrical pulses from the light sensitive means.

2. Apparatus as described in claim 1, further comprising recording means connected to the output signal means for recording the output signal.

3. Apparatus as described in claim 2 in which the image locator means includes a plurality of image sensors arranged so that the reflected light beam will scan across them, causing each image sensor to provide an electrical pulse, and an OR gate connected to the image sensors and to the second laser for providing the pulses from the image sensors as the control pulses to the second laser.

4. Apparatus as described in claim 2 in which the electrical pulse means include a plurality of image sensors which are responsive to light for providing an electrical output so that when a light pulse strikes an image sensor it will in turn provide an electrical pulse, and an OR gate connected to all the image sensors and to the output signal means passes the electrical pulses from the image sensors to the output signal means.

5. Apparatus as described in claim 2 in which the image locator means further comprises two additional image sensors arranged with the other image sensors to that one of them is a 'start' image sensor and the other is an 'end' image sensor, and means connected to the start and to the end image sensors for shaping the pulses to provide a 'start' pulse and an 'end' pulse, respectively, and the output signal means includes a shift register connected to the OR gates in the image locator means and in the electrical pulse means which is contrilled by the control pulses from the image locator means to enter the electrical pulses from the electrical pulse means and to provide digital signals corresponding to its content.

6. Apparatus as described in claim 4 in which the output signal means further comprises means connected to the image locator means for controlling the recording of the output signals in accordance with the 'start' and 'end' pulses.

7. Apparatus as described in claim 5 in which the recorder control means includes an inverter connected to the pulse shaping means in the image locator means for inverting the 'end' pulse, first flip-flop means connected to the inverter and being triggered to a set state by the inverted pulse for providing a control signal at one logic level while in the set state and providing the control signal at another logic level while in the clear state, a first one-shot multivibrator connected to the inverter and responsive to an inverted pulse for providing a pulse, second flip-flop means connected to the first flip-flop means and to the first one-shot multivibrator and triggered to a set state by a pulse from the first one-shot multivibrator for providing a first control signal at one logic level while in the set state and at another logic level while in the clear state and for providing a second control signal to the first flip-flop means which is at the other logic level while the second flip-flop means is in the set state and at the one logic level when the second flip-flop means is in the clear state, said second control signal triggers the first flip-flop means to a clear state when changing from the other logic level to the one logic level, a first plurality of AND gates connected to the shift register and to the first flip-flop means is controlled by the control signal from the first flip-flop means to pass some of the output signals when the control signal from the first flip-flop means is at the one logic level and to block these output signals when the control signal from the first flip-flop means is at the other logic level, a second plurality of AND gates connected to the shift register and to the second flip-flop means for passing the remaining output signals where the first control signal from the second flip-flop means is at the one logic level and for blocking the remaining output signals when the first control signal from the second flip-flop means is at the other logic level, a plurality of OR gates in which each OR gate is connected to corresponding AND gates in the first and second pluralities of AND gates and to the recording means for passing the output signals passed by the AND gates to the recording means, second and third one-shot multivibrators connected to the inverter and to the first one-shot multivibrator, respectively, for providing pulses to a one-to-one basis to the inverted pulse and to the pulse from the first one-shot multivibrator, respectively, an OR gate connected to the second and third one-shot multivibrators, a fourth one-shot multivibrator connected to the OR gate and responsive to passed pulses from the OR gate to provide 'write' pulses to the recorder means, and a fifth one-shot multivibrator connected to the fourth one-shot multivibrator and responsive to the trailing edge of the 'write' pulse to provide pulses to the recording means causing it to advance the tape.

* * * * *